No. 726,257. PATENTED APR. 28, 1903.
C. COLAHAN.
CARRIER APRON.
APPLICATION FILED OCT. 24, 1902.
NO MODEL.

Witnesses:
M. H. Colahan
L. N. Opterman

Inventor,
Chas Colahan

UNITED STATES PATENT OFFICE.

CHARLES COLAHAN, OF CHICAGO, ILLINOIS.

CARRIER-APRON.

SPECIFICATION forming part of Letters Patent No. 726,257, dated April 28, 1903.

Application filed October 24, 1902. Serial No. 128,590. (No model.)

*To all whom it may concern:*

Be it known that I, CHARLES COLAHAN, a citizen of the United States, residing at Chicago, county of Cook, and State of Illinois, have invented certain new and useful Improvements in Carrier-Aprons, of which the following is a specification, reference being had to the accompanying drawings, forming a part hereof.

The object of this improvement is a carrier-belt or endless apron specially suitable for use on harvesting or threshing machines, but adapted to and intended for general application where such mechanism is necessary.

My invention is specially designed to secure a permanent and durable means for attaching the apron-slat to the carrier or elevator apron of the harvester. It is well known that in the use of harvesters the straw is liable to get under the front edge of the slat. This takes place at the moment the slat rises over the roller, when the front edge of the slat tilts up from the apron, to which it is secured by central fastenings, with its base resting flat upon the surface of the apron only when the latter is horizontal. Thus straw is caught in the cleft between the slat and the apron at said moment and is clamped down upon the apron by the closing of the cleft as said apron straightens out in its onward movement. It has been sought to remedy this defect by fixing the slat rigidly to the apron along both edges; but this only introduces another objectionable feature. The base of the slat cannot conform to the roller as it passes therearound, except along a single longitudinal line, which gradually shifts from the front edge to the rear during the passage. It consequently holds the apron away therefrom for a considerable space each side of that line, prevents the even frictional contact that is so essential, and causes slip, particularly when the crop is heavy. I obviate these difficulties by securing the slat at its front edge only to the apron-carrier, while the rear edge is free to rise as it passes around the roller, thus permitting the apron to adhere to the roller as fully and completely as would a driving-belt, its elastic tension not being disturbed or affected by the slat fastened thereto as it passes around the roller. The front edge of the slat is also always close down upon the carrier, so that no straws can be caught thereunder. An apron having the slats thus attached is not liable to vary in its movements or slip in passing around the carrier-rollers.

Figure 1:
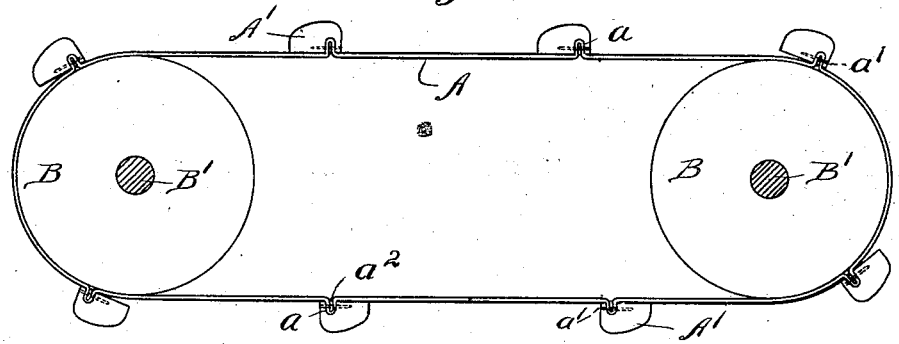
Figure 2:
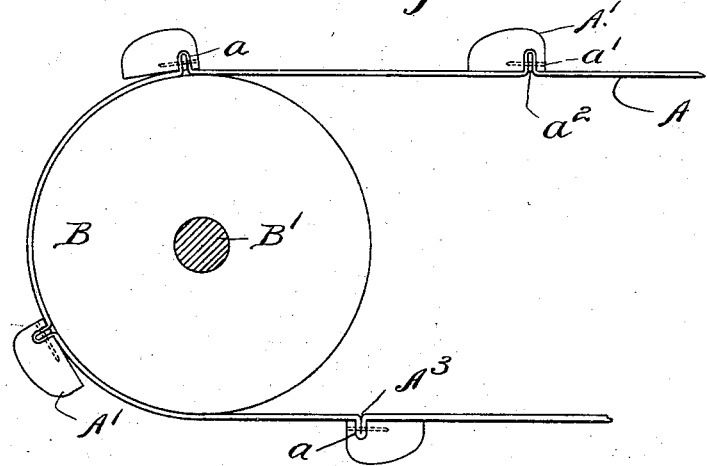
Figure 3:
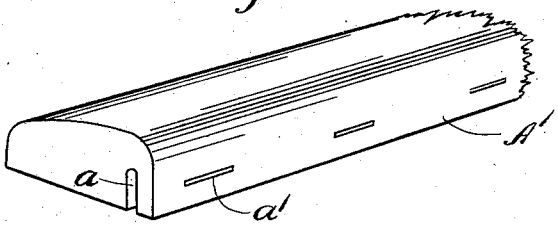

In the drawings, Figure 1 is a side elevation of an apron mounted on rollers. Fig. 2 is a sectional view of the same enlarged. Fig. 3 is a perspective view of a section of the apron-slat.

In the drawings, A is the belt or apron proper, which may be of any suitable material; A', the transverse straw-carrier slat, having the longitudinal apron-holding groove $a$ at its front edge extending the entire length of the slat; $a$, a holding-key, which may be of any material inserted to press the apron within the groove and aid the staple in securing the same; but under certain circumstances this holding-key may be omitted, as shown at A in Fig. 2.

B is the apron supporting and actuating roller, and B' its shaft.

Each cross-slat is connected to the apron, which is pressed firmly into the longitudinal holding-groove at the front edge of the slat and held therein by wire staples $a'$, that are driven transversely through the front edge of the slat, above the apron, and extend horizontally through the groove and apron.

The machinery provided for automatically attaching the slat to the apron and forming and driving the staple is not shown here, but is the subject of another application. I form my apron-slats higher at the front edge than at the back, giving it a more positive carrying capacity and admitting the escape of the straw over the rear edge as it passes downwardly over the roller.

While I have described specific means for securing the slat to the apron, I do not limit myself to the employment of such means, considering that the slat may be attached in various other ways without departing from the spirit of my invention.

Having thus described my invention, what I claim, and desire to secure by Letters Patent, is—

1. The combination of the carrier-apron and its transverse slat secured to the apron by the front edge only substantially as shown and described.

2. The combination of the carrier-apron and its transverse slat having a single apron-holding groove at the front edge thereof, and the fastening-staples passed transversely through said slat and the groove and the fold of the apron inserted in the groove substantially as shown and described.

CHARLES COLAHAN.

Witnesses:
M. H. COLAHAN,
L. H. OSTERMAN.